United States Patent
Ozawa

(10) Patent No.: US 7,458,369 B2
(45) Date of Patent: *Dec. 2, 2008

(54) SUPERCHARGER LUBRICATION STRUCTURE

(75) Inventor: Shigeyuki Ozawa, Shizukoa-ken (JP)

(73) Assignee: Yamaha Marine Kabushiki Kaisha, Shizuoka (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/226,497

(22) Filed: Sep. 14, 2005

(65) Prior Publication Data

US 2006/0060170 A1 Mar. 23, 2006

(30) Foreign Application Priority Data

Sep. 14, 2004 (JP) ............................. 2004-266611

(51) Int. Cl.
*F02B 33/00* (2006.01)
*F02B 33/44* (2006.01)
*F02B 39/14* (2006.01)
*F04C 29/04* (2006.01)
*F04C 18/00* (2006.01)
*F01C 21/04* (2006.01)
*F04B 17/00* (2006.01)
*F16H 57/04* (2006.01)
*F01M 1/00* (2006.01)
*F01M 9/06* (2006.01)

(52) U.S. Cl. .................. 123/559.1; 123/561; 60/605.3; 418/101; 418/201.1; 184/6.12; 184/13.1; 184/6.16; 417/410.4

(58) Field of Classification Search .............. 123/559.1, 123/561; 60/605.3; 418/101, 201.1, 9, 85; 415/122.1, 111, 112, 177, 178, 175, 72; 417/406–407, 417/410.4; 184/6.11, 6.12, 6.16, 13.1

See application file for complete search history.

(56) References Cited

U.S. PATENT DOCUMENTS 1,871,662 A * 8/1932 Carrier ...................... 415/111

(Continued)

FOREIGN PATENT DOCUMENTS

EP 44348 A1 1/1982

(Continued)

OTHER PUBLICATIONS

Co-Pending U.S. Appl. No. 11/224,829, filed Sep. 12, 2005. Title: Supercharger Lubrication Structure. Inventors: Shigeyuki Ozawa.

*Primary Examiner*—Thai-Ba Trieu
(74) *Attorney, Agent, or Firm*—Knobbe, Martens, Olson & Bear, LLP

(57) ABSTRACT

A supercharger can have a lubrication system that includes a speed increasing mechanism, accommodated in a second housing, for increasing the rotation speed of a drive shaft and transmitting the increased rotation speed to a rotary shaft. An oil sump can be configured to for hold lubricant oil for lubricating the speed increasing mechanism. A pump mechanism can be driven by the rotation of the drive shaft to supply the lubricant oil held in the oil sump to the speed increasing mechanism, in which the pump mechanism is constituted with a screw pump made up of a screw provided on the drive shaft. A pump chamber can rotatably support the drive shaft and accommodate the screw. An oil introduction hole and an oil introduction tube can connect the oil sump and the interior of the pump chamber, and a gap can be formed between the screw and the pump chamber.

19 Claims, 7 Drawing Sheets

U.S. PATENT DOCUMENTS

| | | | |
|---|---|---|---|
| 1,876,948 A | 9/1932 | Jahnke | |
| 1,903,210 A * | 3/1933 | Carrier | 415/122.1 |
| 1,974,974 A * | 9/1934 | Puffer | 184/13.1 |
| 2,151,075 A * | 3/1939 | Berger | 123/561 |
| 2,223,715 A * | 12/1940 | Berger | 123/561 |
| 2,344,366 A * | 9/1944 | Price | 415/175 |
| 2,366,365 A | 1/1945 | Sorensen | |
| 2,378,452 A | 6/1945 | Vincent | |
| 2,406,388 A * | 8/1946 | Larrecq | 184/6.12 |
| 2,523,588 A * | 9/1950 | Ormsby | 415/72 |
| 2,565,060 A | 8/1951 | Beardsley et al. | |
| 2,828,907 A * | 4/1958 | Oehrli | 415/122.1 |
| 2,847,186 A * | 8/1958 | Anderson et al. | 415/122.1 |
| 2,973,894 A * | 3/1961 | Kimball et al. | 415/122.1 |
| 3,418,986 A * | 12/1968 | Scherenberg | 123/559.1 |
| 3,554,322 A | 1/1971 | Deutschmann et al. | |
| 3,703,877 A | 11/1972 | Ueda | |
| 3,995,603 A | 12/1976 | Thien et al. | |
| 4,010,717 A | 3/1977 | Taplin | |
| 4,035,171 A | 7/1977 | Reed et al. | |
| 4,068,612 A | 1/1978 | Meiners | |
| 4,198,217 A | 4/1980 | Erdmannsdorfer | |
| 4,212,659 A | 7/1980 | Magrini | |
| 4,267,811 A | 5/1981 | Springer | |
| 4,285,632 A * | 8/1981 | DeSalve | 415/175 |
| 4,300,488 A | 11/1981 | Cser | |
| 4,319,657 A | 3/1982 | Nomura | |
| 4,321,896 A | 3/1982 | Kasting | |
| 4,326,374 A | 4/1982 | Streb | |
| 4,353,211 A | 10/1982 | Cser et al. | |
| 4,412,520 A | 11/1983 | Mitsuyasu et al. | |
| 4,422,295 A | 12/1983 | Minami et al. | |
| 4,459,808 A | 7/1984 | Rydquist et al. | |
| 4,475,617 A | 10/1984 | Minami et al. | |
| 4,496,019 A | 1/1985 | Tanaka | |
| 4,512,152 A | 4/1985 | Asaba | |
| 4,513,725 A | 4/1985 | Minami et al. | |
| RE31,877 E | 5/1985 | Nomura | |
| 4,519,373 A | 5/1985 | Hardy et al. | |
| 4,538,556 A | 9/1985 | Takeda | |
| 4,553,515 A | 11/1985 | King et al. | |
| 4,562,697 A | 1/1986 | Lawson | |
| 4,630,446 A | 12/1986 | Iwai et al. | |
| 4,633,826 A | 1/1987 | Tominaga et al. | |
| 4,662,323 A | 5/1987 | Moriya | |
| 4,674,457 A | 6/1987 | Berger et al. | |
| 4,677,826 A | 7/1987 | Iwai et al. | |
| 4,678,441 A | 7/1987 | Murase | |
| 4,709,682 A | 12/1987 | Kato | |
| 4,712,517 A | 12/1987 | Anno et al. | |
| 4,718,396 A | 1/1988 | Shimada et al. | |
| 4,723,526 A | 2/1988 | Horiuchi et al. | |
| 4,738,229 A | 4/1988 | Wada et al. | |
| 4,741,302 A | 5/1988 | Oda et al. | |
| 4,760,703 A | 8/1988 | Minami et al. | |
| 4,773,361 A | 9/1988 | Toki et al. | |
| 4,781,553 A * | 11/1988 | Nomura et al. | 418/201.1 |
| 4,796,574 A | 1/1989 | Fuji et al. | |
| 4,797,068 A * | 1/1989 | Hayakawa et al. | 418/201.1 |
| 4,827,722 A | 5/1989 | Torigai | |
| 4,848,170 A | 7/1989 | Inagaki et al. | |
| 4,887,692 A | 12/1989 | Outani et al. | |
| 4,896,734 A | 1/1990 | Horiuchi et al. | |
| 4,900,343 A | 2/1990 | Minami et al. | |
| 4,936,278 A | 6/1990 | Umeda | |
| 4,938,664 A * | 7/1990 | Zinsmeyer | 184/6.16 |
| 4,955,352 A * | 9/1990 | Takeda | 123/559.1 |
| 4,972,807 A | 11/1990 | Morishita | |
| 4,982,682 A | 1/1991 | Hattori | |
| 4,984,528 A | 1/1991 | Kobayashi | |
| 4,984,974 A * | 1/1991 | Naya et al. | 418/201.1 |
| 4,989,409 A | 2/1991 | Nakase et al. | |
| 4,991,532 A | 2/1991 | Locke | |
| 5,002,021 A | 3/1991 | Nakata et al. | |
| 5,009,204 A | 4/1991 | Ishii | |
| 5,014,816 A | 5/1991 | Dear et al. | |
| 5,031,591 A | 7/1991 | Shinoda et al. | |
| 5,060,622 A | 10/1991 | Suzuki | |
| 5,088,280 A | 2/1992 | Scott-Scott et al. | |
| 5,094,193 A | 3/1992 | Yoshikawa | |
| 5,095,859 A | 3/1992 | Iwata et al. | |
| 5,119,795 A | 6/1992 | Goto et al. | |
| 5,130,014 A | 7/1992 | Volz | |
| 5,133,307 A | 7/1992 | Kurihara | |
| 5,136,547 A | 8/1992 | Laukien | |
| 5,136,993 A | 8/1992 | Ampferer et al. | |
| 5,143,028 A | 9/1992 | Takahashi | |
| 5,158,427 A * | 10/1992 | Shirai | 415/122.1 |
| 5,159,903 A | 11/1992 | Takahashi | |
| 5,163,811 A | 11/1992 | Okada | |
| RE34,226 E | 4/1993 | Morishita | |
| 5,215,164 A | 6/1993 | Shibata | |
| 5,230,320 A | 7/1993 | Hitomi et al. | |
| 5,239,950 A | 8/1993 | Takahashi | |
| 5,243,945 A | 9/1993 | Katoh et al. | |
| 5,253,618 A | 10/1993 | Takahashi et al. | |
| 5,261,356 A | 11/1993 | Takahashi et al. | |
| 5,293,846 A | 3/1994 | Takahashi | |
| 5,299,423 A | 4/1994 | Shiozawa et al. | |
| 5,330,374 A | 7/1994 | Ishino | |
| 5,340,343 A | 8/1994 | Kawamukai et al. | |
| 5,340,344 A | 8/1994 | Mineo et al. | |
| 5,357,913 A | 10/1994 | Okumura et al. | |
| 5,365,908 A | 11/1994 | Takii et al. | |
| 5,377,629 A | 1/1995 | Brackett et al. | |
| 5,377,634 A | 1/1995 | Taue | |
| 5,389,022 A | 2/1995 | Kobayashi | |
| 5,390,621 A | 2/1995 | Hattori et al. | |
| RE34,922 E | 5/1995 | Hattori et al. | |
| 5,438,946 A | 8/1995 | Kobayashi | |
| 5,456,230 A | 10/1995 | VanRens et al. | |
| 5,476,402 A | 12/1995 | Nakai et al. | |
| 5,477,838 A | 12/1995 | Schlunke et al. | |
| 5,503,117 A | 4/1996 | Saito | |
| 5,513,606 A | 5/1996 | Shibata | |
| 5,529,027 A | 6/1996 | Okubo | |
| 5,537,968 A | 7/1996 | Takahashi | |
| 5,558,549 A | 9/1996 | Nakase et al. | |
| 5,584,733 A | 12/1996 | Kobayashi | |
| 5,586,922 A | 12/1996 | Kobayashi et al. | |
| 5,603,301 A | 2/1997 | Sakurai et al. | |
| 5,619,950 A | 4/1997 | Ikeda | |
| 5,632,239 A | 5/1997 | Patyi et al. | |
| 5,634,422 A | 6/1997 | Kobayashi et al. | |
| 5,636,586 A | 6/1997 | Suganuma | |
| 5,638,796 A * | 6/1997 | Adams et al. | 123/565 |
| 5,647,779 A | 7/1997 | Nanami | |
| 5,660,155 A | 8/1997 | Taue et al. | |
| 5,660,571 A | 8/1997 | Nakayasu et al. | |
| 5,664,515 A | 9/1997 | Hattori et al. | |
| 5,671,703 A | 9/1997 | Otome et al. | |
| 5,678,525 A | 10/1997 | Taue | |
| 5,682,870 A | 11/1997 | Motoyama | |
| 5,699,749 A | 12/1997 | Yamada et al. | |
| 5,709,185 A | 1/1998 | Aizawa et al. | |
| 5,709,186 A | 1/1998 | Taue | |
| 5,709,198 A | 1/1998 | Sagisaka et al. | |
| 5,743,206 A | 4/1998 | Hattori | |
| 5,746,270 A | 5/1998 | Schroeder et al. | |
| 5,755,194 A | 5/1998 | Moorman et al. | |
| 5,769,039 A | 6/1998 | Taue et al. | |
| 5,775,283 A | 7/1998 | Sawai et al. | |
| 5,778,833 A | 7/1998 | Kuranishi | |
| 5,778,838 A | 7/1998 | Taue | |

| | | | | | | |
|---|---|---|---|---|---|---|
| 5,778,857 | A | 7/1998 | Nakamura et al. | 6,663,366 | B2 * 12/2003 | Okada et al. ................ 418/101 |
| 5,779,451 | A * | 7/1998 | Hatton ........................... 418/9 | 6,672,918 | B2  1/2004 | Mashiko et al. |
| 5,797,778 | A | 8/1998 | Ito et al. | 6,746,288 | B2  6/2004 | Gokan |
| 5,820,426 | A | 10/1998 | Hale | 6,769,942 | B2  8/2004 | Bourret et al. |
| 5,827,096 | A | 10/1998 | Mineo | 6,793,546 | B2  9/2004 | Matsuda |
| 5,829,402 | A | 11/1998 | Takahashi et al. | 6,796,126 | B2 *  9/2004 | Hasegawa et al. ......... 123/559.1 |
| 5,830,021 | A | 11/1998 | Takahashi et al. | 6,810,855 | B2  11/2004 | Hasegawa et al. |
| 5,839,930 | A | 11/1998 | Nanami et al. | 6,896,566 | B2  5/2005 | Takahashi et al. |
| 5,845,618 | A | 12/1998 | Taue et al. | 6,973,985 | B2  12/2005 | Yatagai et al. |
| 5,846,102 | A | 12/1998 | Nitta et al. | 7,007,682 | B2  3/2006 | Takahashi et al. |
| 5,855,193 | A | 1/1999 | Takahashi | 7,101,238 | B2  9/2006 | Aichinger et al. |
| 5,871,340 | A * | 2/1999 | Hatton ........................... 418/9 | 7,247,067 | B2  7/2007 | Mashiko |
| 5,871,380 | A | 2/1999 | Claussen | 2001/0044352 | A1  11/2001 | Korenjak et al. |
| 5,899,778 | A | 5/1999 | Hiraoka et al. | 2002/0025742 | A1  2/2002 | Berthiaume et al. |
| 5,902,161 | A | 5/1999 | Nakase | 2003/0015126 | A1  1/2003 | Gokan |
| 5,906,083 | A | 5/1999 | Olsen et al. | 2005/0172919 | A1  8/2005 | Ozaki et al. |
| 5,908,337 | A | 6/1999 | Mashiko | 2005/0204730 | A1  9/2005 | Tsukahara et al. |
| 5,911,211 | A | 6/1999 | Uchida | 2005/0247498 | A1  11/2005 | Pichler et al. |
| 5,928,044 | A | 7/1999 | Mineo | 2005/0279092 | A1  12/2005 | Ozawa |
| 5,934,070 | A | 8/1999 | Lagelstorfer | 2005/0279335 | A1  12/2005 | Ozawa |
| 5,937,818 | A | 8/1999 | Kawai et al. | 2006/0016437 | A1  1/2006 | Ozawa |
| 5,937,825 | A | 8/1999 | Motose | 2006/0243259 | A1* 11/2006 | Takahashi ................ 123/559.1 |
| 5,941,223 | A | 8/1999 | Kato | 2007/0059997 | A1  3/2007 | Mineo |
| 5,951,343 | A | 9/1999 | Nanami et al. | 2007/0079796 | A1  4/2007 | Mineo |

| | | | | |
|---|---|---|---|---|
| 5,957,072 | A | 9/1999 | Hattori | |
| 5,957,112 | A | 9/1999 | Takahashi et al. | FOREIGN PATENT DOCUMENTS |
| 5,960,770 | A | 10/1999 | Taue et al. | |

| | | | |
|---|---|---|---|
| 5,983,878 | A | 11/1999 | Nonaka et al. |
| 6,006,540 | A | 12/1999 | Coletti |

| | | |
|---|---|---|
| EP | 0 500 139 B1 | 8/1992 |
| FR | 1263608 | 5/1996 |
| GB | 1389973 A * | 4/1975 |
| JP | 57-062929 | 4/1982 |
| JP | 57-062930 | 4/1982 |
| JP | 57-073817 | 5/1982 |
| JP | 57-073818 | 5/1982 |
| JP | 57-073820 | 5/1982 |
| JP | 57-083632 | 5/1982 |
| JP | 57-093627 | 6/1982 |
| JP | 57-105537 | 7/1982 |
| JP | 57-113922 | 7/1982 |
| JP | 57-113944 | 7/1982 |
| JP | 57-151019 | 9/1982 |
| JP | 57-171027 | 10/1982 |
| JP | 57-181931 | 11/1982 |
| JP | 57-183512 | 11/1982 |
| JP | 57-191421 | 11/1982 |
| JP | 57-203822 | 12/1982 |
| JP | 58-044221 | 3/1983 |
| JP | 58-053655 | 3/1983 |
| JP | 58-057023 | 4/1983 |
| JP | 58-082038 | 5/1983 |
| JP | 58-128925 | 8/1983 |
| JP | 58-170628 | 10/1983 |
| JP | 58-185927 | 10/1983 |
| JP | 58-185929 | 10/1983 |
| JP | 58-185930 | 10/1983 |
| JP | 58-185931 | 10/1983 |
| JP | 58-185932 | 10/1983 |
| JP | 58-192924 | 11/1983 |
| JP | 58-194695 | 11/1983 |
| JP | 59-018228 | 1/1984 |
| JP | 59-053229 | 3/1984 |
| JP | 59-176419 | 10/1984 |
| JP | 59-201932 | 11/1984 |
| JP | 59-220492 | 12/1984 |
| JP | 60-119328 | 6/1985 |
| JP | 60-150445 | 8/1985 |
| JP | 60-240522 | 11/1985 |
| JP | 60-240523 | 11/1985 |
| JP | 60-240524 | 11/1985 |
| JP | 60-240525 | 11/1985 |
| JP | 61-126324 | 6/1986 |
| JP | 61-126325 | 6/1986 |
| JP | 61-215123 | 9/1986 |

| | | | |
|---|---|---|---|
| 6,009,705 | A | 1/2000 | Arnott et al. |
| 6,015,320 | A | 1/2000 | Nanami |
| 6,015,321 | A | 1/2000 | Ozawa et al. |
| 6,016,782 | A | 1/2000 | Henmi |
| 6,022,252 | A | 2/2000 | Ozawa |
| 6,026,775 | A | 2/2000 | Yamane |
| 6,029,638 | A | 2/2000 | Funai et al. |
| 6,041,758 | A | 3/2000 | Ishii |
| 6,055,959 | A | 5/2000 | Taue |
| 6,079,378 | A | 6/2000 | Taue et al. |
| 6,085,702 | A | 7/2000 | Ito |
| 6,099,371 | A | 8/2000 | Nozawa et al. |
| 6,142,842 | A | 11/2000 | Watanabe et al. |
| 6,149,477 | A | 11/2000 | Toyama |
| 6,171,380 | B1 | 1/2001 | Wood et al. |
| 6,205,987 | B1 | 3/2001 | Shigedomi et al. |
| 6,213,062 | B1 | 4/2001 | Kawase |
| 6,263,851 | B1 | 7/2001 | Henmi |
| 6,269,797 | B1 | 8/2001 | Uchida |
| 6,279,372 | B1 | 8/2001 | Zhang |
| 6,286,492 | B1 | 9/2001 | Kanno |
| 6,302,752 | B1 | 10/2001 | Ito et al. |
| 6,312,299 | B1 | 11/2001 | Henmi |
| 6,318,085 | B1 | 11/2001 | Torno et al. |
| 6,390,869 | B2 | 5/2002 | Korenjak et al. |
| 6,394,060 | B2 | 5/2002 | Nagai et al. |
| 6,394,777 | B2 * | 5/2002 | Haavik ........................ 418/85 |
| 6,415,759 | B2 | 7/2002 | Ohrnberger et al. |
| 6,447,351 | B1 | 9/2002 | Nanami |
| 6,453,890 | B1 | 9/2002 | Kageyama et al. |
| 6,497,596 | B1 | 12/2002 | Nanami |
| 6,516,789 | B1 * | 2/2003 | Jones ..................... 123/559.1 |
| 6,517,397 | B1 | 2/2003 | Gohara et al. |
| 6,544,086 | B2 | 4/2003 | Tscherne et al. |
| 6,568,376 | B2 * | 5/2003 | Sonnleitner et al. ...... 123/559.1 |
| 6,578,508 | B2 | 6/2003 | Hattori et al. |
| 6,591,819 | B2 | 7/2003 | Tscherne et al. |
| 6,601,528 | B2 | 8/2003 | Bilek et al. |
| 6,623,321 | B2 | 9/2003 | Ishino |
| 6,626,140 | B2 | 9/2003 | Aichinger et al. |
| 6,637,406 | B2 | 10/2003 | Yamada et al. |
| 6,640,754 | B1 | 11/2003 | Iida |
| 6,644,942 | B2 * | 11/2003 | Rival et al. ................ 417/410.4 |
| 6,651,633 | B1 * | 11/2003 | Jones ..................... 123/559.1 |

| | | | | | | |
|---|---|---|---|---|---|---|
| JP | 61-237824 | 10/1986 | | JP | 07-145730 | 6/1995 |
| JP | 62-060926 | 3/1987 | | JP | 07-151006 | 6/1995 |
| JP | 62258130 | 11/1987 | | JP | 07-317545 | 12/1995 |
| JP | 01-119421 | 5/1989 | | JP | 07-317555 | 12/1995 |
| JP | 01-182560 | 7/1989 | | JP | 07-317556 | 12/1995 |
| JP | 01-211615 | 8/1989 | | JP | 07-317557 | 12/1995 |
| JP | 01-229786 | 9/1989 | | JP | 08-028280 | 1/1996 |
| JP | 01-232112 | 9/1989 | | JP | 08-028285 | 1/1996 |
| JP | 01-232113 | 9/1989 | | JP | 08-104286 | 4/1996 |
| JP | 01-232115 | 9/1989 | | JP | 08-104295 | 4/1996 |
| JP | 01-232116 | 9/1989 | | JP | 08-114122 | 5/1996 |
| JP | 01-232118 | 9/1989 | | JP | 08-114123 | 5/1996 |
| JP | 01-301917 | 12/1989 | | JP | 08-114124 | 5/1996 |
| JP | 01-301918 | 12/1989 | | JP | 08-114125 | 5/1996 |
| JP | 01-301919 | 12/1989 | | JP | 08-151926 | 6/1996 |
| JP | 01-313624 | 12/1989 | | JP | 08-151965 | 6/1996 |
| JP | 02-006289 | 1/1990 | | JP | 08-296449 | 12/1996 |
| JP | 02-016327 | 1/1990 | | JP | 08-319840 | 12/1996 |
| JP | 02-024282 | 1/1990 | | JP | 08-319901 | 12/1996 |
| JP | 02-024283 | 1/1990 | | JP | 09-184426 | 7/1997 |
| JP | 02-024284 | 1/1990 | | JP | 09-287465 | 11/1997 |
| JP | 02-070920 | 3/1990 | | JP | 09-287467 | 11/1997 |
| JP | 02-119636 | 5/1990 | | JP | 09-287470 | 11/1997 |
| JP | 02-175491 | 7/1990 | | JP | 09-287471 | 11/1997 |
| JP | 02-188624 | 7/1990 | | JP | 09-287472 | 11/1997 |
| JP | 02-201026 | 8/1990 | | JP | 09-287475 | 11/1997 |
| JP | 02-294520 | 12/1990 | | JP | 09-287486 | 11/1997 |
| JP | 03-021584 | 1/1991 | | JP | 10-008973 | 1/1998 |
| JP | 03-023317 | 1/1991 | | JP | 10-008974 | 1/1998 |
| JP | 03-047425 | 2/1991 | | JP | 10-089079 | 4/1998 |
| JP | 03-168352 | 7/1991 | | JP | 10-131818 | 5/1998 |
| JP | 03168329 A * | 7/1991 | .............. 123/559.1 | JP | 10-299525 | 11/1998 |
| JP | 03-179152 | 8/1991 | | JP | 2000-038968 | 2/2000 |
| JP | 03-182626 | 8/1991 | | JP | B-3060489 | 4/2000 |
| JP | 03-182635 | 8/1991 | | JP | 2001-082160 | 3/2001 |
| JP | 03-260368 | 11/1991 | | JP | 2001-098960 | 4/2001 |
| JP | 03-281939 | 12/1991 | | JP | 2001-233276 | 8/2001 |
| JP | 04-081325 | 3/1992 | | JP | 2001-233277 | 8/2001 |
| JP | 04-203317 | 7/1992 | | JP | 2001-263076 | 9/2001 |
| JP | 07-311626 | 11/1992 | | JP | 2001-280144 | 10/2001 |
| JP | 05106457 A * | 4/1993 | .............. 123/559.1 | JP | 2001323819 A * | 11/2001 |
| JP | 05-141260 | 6/1993 | | JP | 2003-027952 | 1/2003 |
| JP | 05-141262 | 6/1993 | | JP | 2003-049654 | 2/2003 |
| JP | 05-332188 | 12/1993 | | JP | 2003-074445 | 3/2003 |
| JP | 06-093869 | 4/1994 | | JP | 2006-083713 | 3/2006 |
| JP | 06-212986 | 8/1994 | | | | |
| JP | 07-091264 | 4/1995 | | * cited by examiner | | |

US 7,458,369 B2

SUPERCHARGER LUBRICATION STRUCTURE

PRIORITY INFORMATION

The present application is based on and claims priority under 35 U.S.C. § 119(a-d) to Japanese Patent Application No. 2004-266611, filed on Sep. 14, 2004, the entire contents of which is expressly incorporated by reference herein.

BACKGROUND OF THE INVENTIONS

1. Field of the Inventions

These inventions relate to devices for raising a pressure of intake air for internal combustion engines, and more particularly, to a lubrication mechanisms for such devices.

2. Description of the Related Art

Superchargers, turbos, and other devices are used for supplying compressed air to the combustion chamber of engines to raise the power output of the engines. Superchargers typically include a rotor mounted on a shaft that is driven by the crankshaft of the associated engine. In some supercharger designs, the speed of the rotor relative to the crankshaft can be increased with a speed increasing mechanism.

In such a supercharger, lubricant oil can be supplied to the speed increasing mechanism to smooth its operation. Japanese Patent Document JP-B-3060489 discloses such a lubrication system for a supercharger. In this supercharger, lubricant oil is sealed in a housing accommodating the speed increasing mechanism. This speed increasing mechanism is a planetary roller type, including two (front and rear) stages.

In this system, a disk-shaped plate, which is a component of the rear one of the two-staged speed increasing mechanism, is provided with a first through hole bored along its axis and a second through hole is bored from the first through hole to the periphery of the plate. When the disk rotates, lubricant oil is urged into the first through hole and flows out of the second through hole by the rotation of the plate. Thus, the disk operates as a centrifugal pump and thereby supplies the oil to the planetary roller type speed increasing mechanism accommodated in the housing.

SUMMARY OF THE INVENTIONS

An aspect of at least one of the embodiments disclosed herein includes the realization that superchargers utilizing the centrifugal pump type lubrication system are difficult to reduce in size because a sufficient amount of lubricant oil cannot be supplied unless the plate diameter or the plate revolution is a minimum size. Increasing the plate diameter here invites a problem of increased size of the supercharger as a whole as well as power loss due to increased moment of inertia and churning resistance of lubricant oil when the plate rotates. Another problem is that, when the plate is to be rotated at higher speeds, the speed increasing mechanism becomes more complicated in structure and more expensive. Thus, one way to reduce the size of a supercharger is to use a lubricant pump that is not of the centrifugal type.

Thus, in accordance with an embodiment, a supercharger is provided, the supercharger comprising a drive shaft configured to be driven by the rotation of an engine, a supercharging mechanism including a turbine, a rotary shaft connected to the turbine, and a speed increasing mechanism accommodated in a housing located between the engine and the supercharging mechanism, the speed increasing mechanism being configured to increase the rotation speed of the drive shaft and to transmit the increased rotation speed to the rotary shaft. The supercharger can also include an oil sump configured to hold lubricant oil for lubricating the speed increasing mechanism, and a pump mechanism driven by the rotation of the drive shaft and configured to supply the lubricant oil held in the oil sump to the speed increasing mechanism. The pump mechanism can comprise a screw pump including a screw spirally provided concentrically on the drive shaft over the outside round surface of the drive shaft, a cylindrical member rotatably supporting the drive shaft with a support device and accommodating the screw, and an oil introduction passage configured to connect the oil sump and the interior of the cylindrical member, and wherein a gap is provided between the peripheral edge portion of the screw and the inside round surface of the cylindrical member.

BRIEF DESCRIPTION OF THE DRAWINGS

The above-mentioned and other features of the inventions disclosed herein are described below with reference to the drawings of preferred embodiments. The illustrated embodiments are intended to illustrate, but not to limit the inventions. The drawings contain the following Figures.

DETAILED DESCRIPTION OF THE PREFERRED EMBODIMENT

Figure 1:
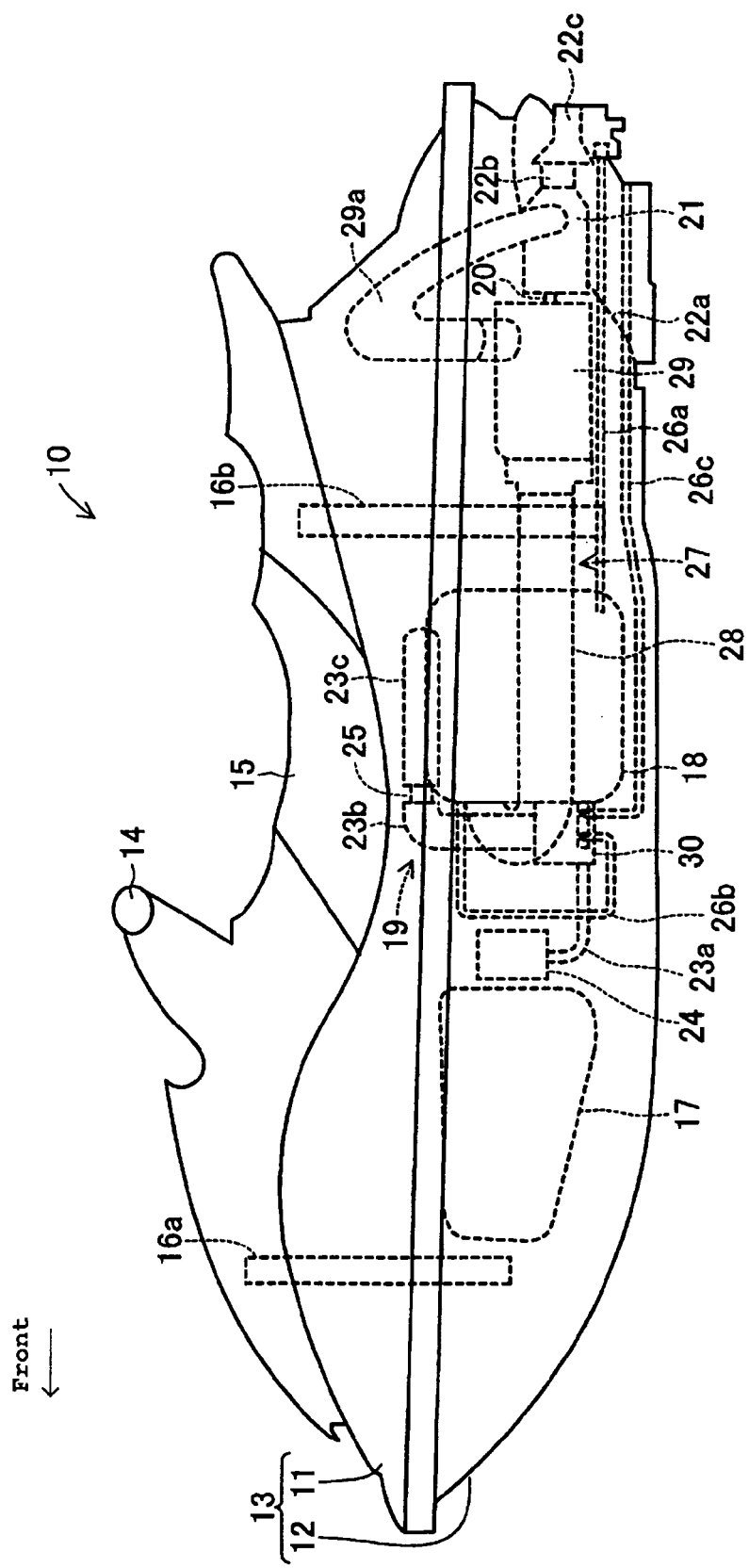
FIG. 1 is a side view of a watercraft provided with a supercharger lubrication system in accordance with an embodiment.

FIG. 1 illustrates a personal watercraft 10 having lubrication system for a supercharger in accordance with several embodiments. The lubrication system is disclosed in the context of a personal watercraft because it has particular utility in this context. However, the lubrication system mechanism can be used in other contexts, such as, for example, but without limitation, outboard motors, inboard/outboard motors, and for engines of other vehicles including land vehicles.

FIG. 1 shows a watercraft 10 provided with a supercharger lubrication system. The watercraft 10 can include a deck 11 and a hull 12, with their peripheries joined together in a generally watertight state to form a boat body 13. Steering handlebars 14 can be provided over the deck 11, slightly forward of the center, in an operator's area. A seat 15 can be provided over the deck 11, behind the steering handlebars 14.

Front and rear sides of the interior of the boat body 13 can be respectively provided with air ducts 16a and 16b for guiding external air into the interior of the boat body 13. These air ducts 16a and 16b can be formed to extend vertically from the upper part to the bottom part of the boat body 13 to draw air from outside the boat body through a waterproof structure (not shown) provided on the deck 11 and through the lower end into the interior of the boat body 13.

A fuel tank 17 for holding fuel can be placed in a forward part and at the bottom of the interior of the boat body 13. An engine 18, which can serve as a power source of the watercraft 10, can be placed in the central part at the bottom of the interior of the boat body 13.

Figure 2:
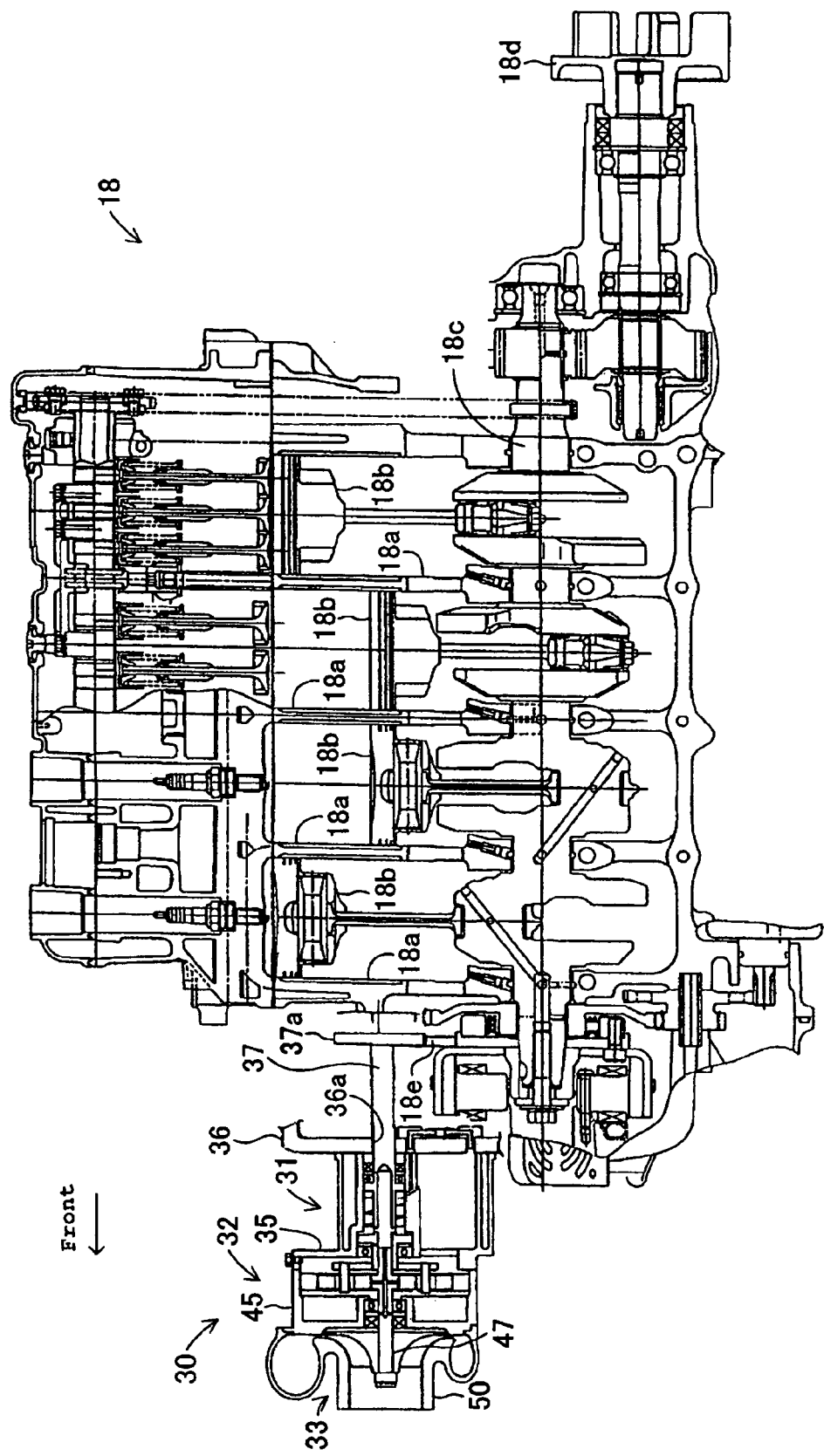
FIG. 2 is a sectional view of an engine that can be used with the watercraft of FIG. 1 and which includes an embodiment of a lubrication system for a supercharger.

As shown in FIG. 2, the engine 18 can be of a water-cooled, in-line, four-cylinder, four-stroke type of engine. However, this is merely one type of engine that can be used. Other types of engines can be used which operate on other types of combustion principles (e.g., diesel, rotary, two-stroke), have other cylinder configurations (V-type, W-type, horizontally opposed, etc.), and have other numbers of cylinders.

As intake and exhaust valves (not shown) provided on respective cylinders 18a are driven to open and close, a mixture of air supplied through an intake system 19 provided on the intake valve side and fuel supplied from the fuel tank 17 through a fuel system (not shown) can be drawn in, and exhaust gas can be discharged to an exhaust system 27 provided on the exhaust valve side.

The mixture supplied from the intake valve side into the engine 18 can be ignited with an ignition system provided on the engine 18. With the detonation, pistons 18b provided in the engine 18 reciprocate up and down. The motion of the pistons 18b drives a crankshaft 18c to rotate.

The crankshaft 18c can extend rearwardly from the rear part of the engine 18, connected through a coupling 18d to a pump drive shaft 20. Rotary force from the crankshaft 18c can be transmitted to the pump drive shaft 20.

The rear end of the pump drive shaft 20 can be connected to an impeller (not shown) of a jet pump 21 placed in the rear part generally in the center of width of the boat body 13. As the impeller rotates, the watercraft 10 produces propulsion force.

The jet pump 21 can have a water introduction port 22a opening at the bottom of the boat body 13 and a water jet port 22b opening at the stern. Thus, during operation, the jet pump 21 produces a propulsion force on the boat body 13 by jetting out water introduced through the water introduction port 22a, by the rotation of the impeller, through the water jet port 22b.

A deflector 22c, for changing the direction of jet flow out of the water jet port 22b right and left according to operation on the steering handlebars 14, can be attached to the rear end of the water jet port 22b. Changing the direction of the deflector 22c, rightward and leftward, permits the moving direction of the watercraft 10 to turn right and left.

The intake system 19 can include an intake box 24, a supercharger 30, an intercooler (not shown), a throttle body 25, and an intake tube 23c, although other configurations can also be used.

The intake box 24 can be placed between the engine 18 and the fuel tank 17, slightly closer to the fuel tank 17, with a clearance between it and the engine 18. The intake system can be configured to guide air, drawn through the air ducts 16a and 16b, into the boat body 13, into the intake box 24, and to the supercharger 30 through an air passage 23a.

The supercharger 30 can be configured to compresses air supplied from the intake box 24 and to discharge the compressed air to the intercooler. The intercooler can be configured to cool the compressed air supplied from the supercharger 30 to increase its density and to discharge the cooled and compressed air to the throttle body 25 through an air duct 23b. The throttle body 25 can be configured to regulate the flow rate of the compressed air and to guide the air through the intake tube 23c to the respective cylinders of the engine 18.

The supercharger 30 provided on the intake system 19 can be placed on the front end side of the engine 18 adjacent to the engine 18. In some embodiments, a flywheel 18e can be attached to the front end of the crankshaft 18c of the engine 18, with the flywheel 18e connected to a drive shaft 37 through a drive gear 37a.

The drive shaft 37 can be configured to rotate with the rotary force of the engine 18 transmitted through the flywheel 18e and the drive gear 37a when the crankshaft 18c rotates with the operation of the engine 18. The supercharger 30 can be provided at the front end portion of the drive shaft 37 through a wall 36. In some embodiments, the front end portion of the drive shaft 37 extends forward through a through hole 36a bored in the wall 36, with the supercharger 30 placed on the front side of the wall 36.

Figure 3:
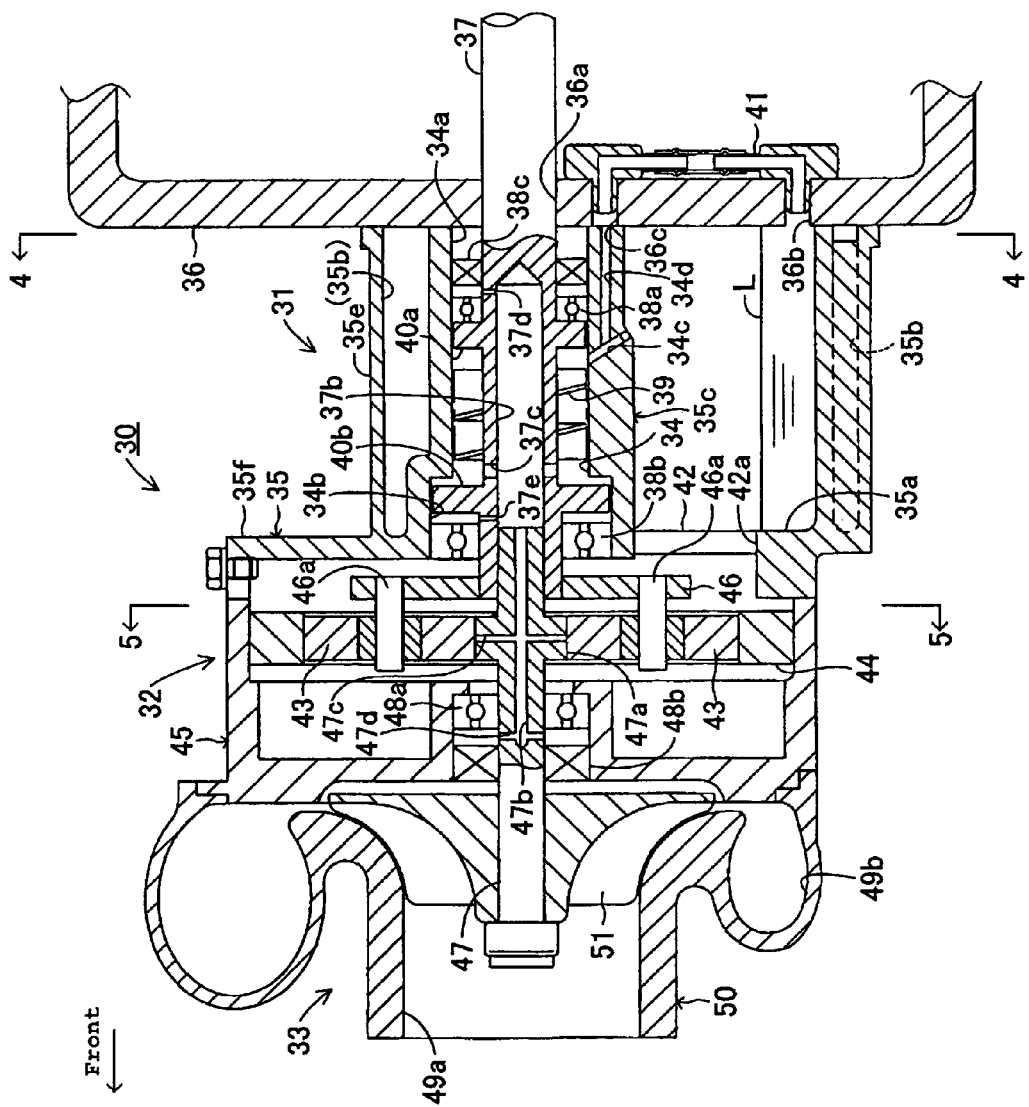
FIG. 3 is an enlarged sectional view the supercharger lubrication system shown in FIG. 2.

The supercharger 30 as shown in FIG. 3 can include a pump mechanism 31, a speed increasing mechanism 32, and a supercharging mechanism 33 placed in this order from the engine 18 side toward the bow, however, other configurations can also be used.

The pump mechanism 31, which can be in the form of a screw pump, can include a pump chamber 34 formed in a partition wall 35c, serving as a cylindrical member, formed around the drive shaft 37. An oil sump 35a can be formed below the pump chamber 34, and a coolant fluid chamber 35b can be formed around both the pump chamber 34 and the oil sump 35a. The pump chamber 34, the oil sump 35a, and the coolant fluid chamber 35b can be isolated with a first housing 35 made up of the partition wall 35c, etc.

Figure 4:
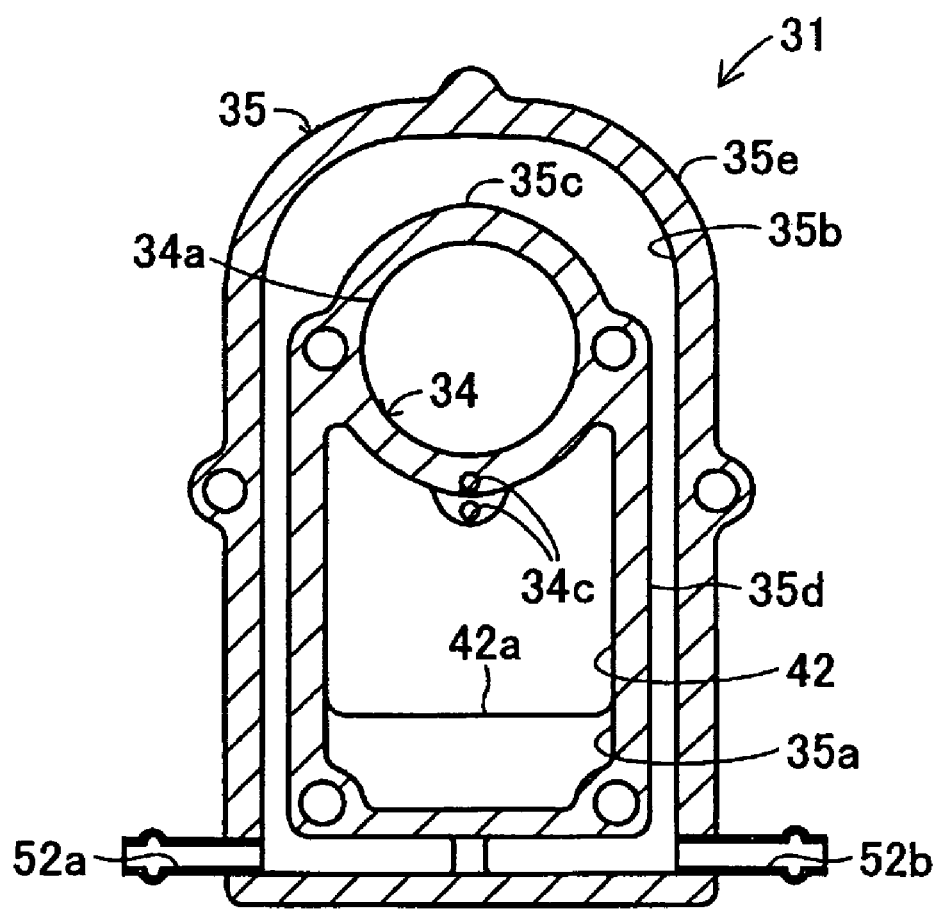
FIG. 4 is a sectional view taken along line 4-4 in FIG. 3.

For example, in some embodiments, the first housing 35 can include, as shown in FIG. 4, the partition wall 35c, a partition wall 35d formed below the partition wall 35c to form the oil sump 35a of an approximately square cylindrical shape, together with the lower portion of the partition wall 35c, and a partition wall 35e extending around both the upper portion of the partition wall 35c and the outer side of the partition wall 35d. The engine 18 sides of the pump chamber 34, the oil sump 35a, and the coolant fluid chamber 35b are closed with the wall 36. The bow side of the coolant fluid chamber 35b can be closed with a disk-shaped wall 35f (not shown in FIG. 4) extending from the bow side face of the partition wall 35c toward the partition wall 35e. The first housing 35 can be made up of the partition walls 35c, 35d, 35e, and the wall 35f.

The pump chamber 34 can be made up of a small diameter portion 34a, on the rear side of the chamber 34, and a large diameter portion 34b on the front side of the chamber 34. A bearing 38a and a bearing 38b of different sizes can be provided respectively in the rear end portion of the small diameter portion 34a and in the front end portion of the larger diameter portion 34b of the pump chamber 34.

The drive shaft 37 can be rotatably supported with the bearings 38a and 38b. In other words, the inside diameters of the bearings 38a and 38b are set to values corresponding to the inside diameters of the small diameter portion 34a and the large diameter portion 34b. With respect to the outside diameter of the drive shaft 37, the outside diameter of the bearing 38b can be set to be greater than that of the bearing 38a, and the inside diameters of the bearings 38a and 38b can be identical.

At the front end of the oil sump 35a can be formed a communication hole 42, which can function as a communication flow passage. The communication hole 42 can be formed by making an opening in part of the wall 35f corresponding to the upper portion side of the oil sump 35a, with a lower end portion 42a of the communication hole 42 located higher than the bottom surface of the oil sump 35a.

The rear end portion of the oil sump 35a can be closed with the wall 36. A through hole 36b can be formed in part of the wall 36 corresponding to the rear part of the bottom of the oil sump 35a. An oil introduction hole 34c for communication between the pump chamber 34 and the oil sump 35a can be formed in the lower portion of the partition wall 35c.

One end of an oil introduction tube 41 can be connected to the through hole 36b, and its other end can be connected, after extending upward from the through hole 36b side, to a through hole 36c provided below the through hole 36a of the wall 36. An oil introduction hole 34d for communication between the through hole 36c and the central part of the oil introduction hole 34c can be provided in the lower part of the partition wall 35c. Therefore, the oil sump 35a can be communicated with the pump chamber 34 through the oil introduction tube 41 and the oil introduction holes 34c and 34d, which can function as an oil introduction.

A coolant water intake port 52a can be provided at the lower part of the portside (left side in FIG. 4) wall of the coolant fluid chamber 35b. A coolant water discharge port 52b can be provided at the lower part of the starboard side (right side in FIG. 4) wall of the coolant fluid chamber 35b.

The coolant water intake port 52a can be connected to a water distribution tube 26b extending from the engine 18. The coolant water discharge port 52b can be connected to a drain tube 26c leading to the exterior of the boat. In other words, the front end of a coolant water intake tube 26a opening at the stern of the boat body 13 can be connected to the rear part of the engine 18 cooled with water supplied through the coolant water intake tube 26a.

During operation, water that has cooled the engine 18 can be sent through the water distribution tube 26b extending forward from the front part of the engine 18 to the supercharger 30. In other words, the water distribution tube 26b, after extending forwardly from the front part of the engine 18, can curve downwardly and can be connected to the coolant water intake port 52a of the coolant fluid chamber 35b. The drain tube 26c can extend rearwardly from the coolant water discharge port 52b of the coolant fluid chamber 35b and then open at the stern of the boat body 13.

A screw 39 formed spirally and centered on the drive shaft 37 can be provided in part of the periphery of the drive shaft 37 corresponding to the front side of the small diameter portion 34a. Generally disk-shaped flange portions 40a and 40b projecting radially from the drive shaft 37 are respectively provided in front of and rear of the screw 39.

The screw 39 can be located in the small diameter portion 34a of the pump chamber 34, with its outside diameter slightly smaller than the inside diameter of the small diameter portion 34a, thereby providing a gap between the screw 39 and the inside wall of the small diameter portion 34a, so as to be rotatable within the pump chamber 34 without contacting with the inside wall of the small diameter portion 34a. The screw pump can comprise the screw 39, the pump chamber 34, the oil introduction holes 34c and 34d, and the oil introduction tube 41.

Figure 3A:
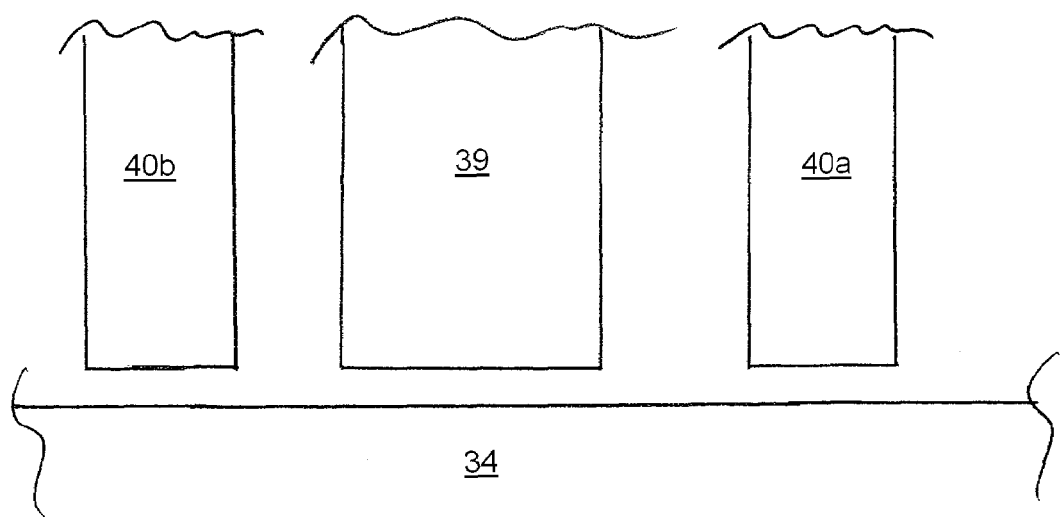
FIG. 3A is a schematic diagram illustrating flanges, screw, and a housing of a screw pump of the lubrication system.

The flange portion 40a can be located in the small diameter portion 34a of the pump chamber 34, with a specified clearance to the rear end of the screw 39, in front of and adjacent to the bearing 38a. The flange portion 40a can be made with an outside diameter slightly smaller than the inside diameter of the small diameter portion 34a, so that a clearance can be provided between the peripheral surface of the flange portion 40a and the inside round surface of the small diameter portion 34a (FIG. 3A).

The flange portion 40b can be located in the large diameter portion 34b of the pump chamber 34, with clearances to the front end of the screw 39 and the rear end of the bearing 38b. The flange portion 40b can be made with an outside diameter slightly smaller than the inside diameter of the large diameter portion 34b, so that a clearance can be present between the peripheral surface of the flange portion 40b and the inside round surface of the large diameter portion 34b (FIG. 3A).

An annular oil seal 38c can be provided, on the engine 18 side of the bearing 38a, around the peripheral surface of the drive shaft 37, with a clearance to the bearing 38a, to prevent lubricant oil from leaking out of the pump chamber 34.

The drive shaft 37 can be provided with a bottom oil hole 37b extending axially from the front end center toward the engine 18. The drive shaft 37 can be also provided with a through hole 37c radially penetrating the drive shaft 37 at a position between the flange portion 40b and the screw 39.

The drive shaft 37 can be also provided with communication holes 37d and 37e respectively between the bearing 38a and the oil seal 38c, and between the flange portion 40b and the bearing 38b, to communicate the oil hole 37b and the pump chamber 34.

Figure 5:
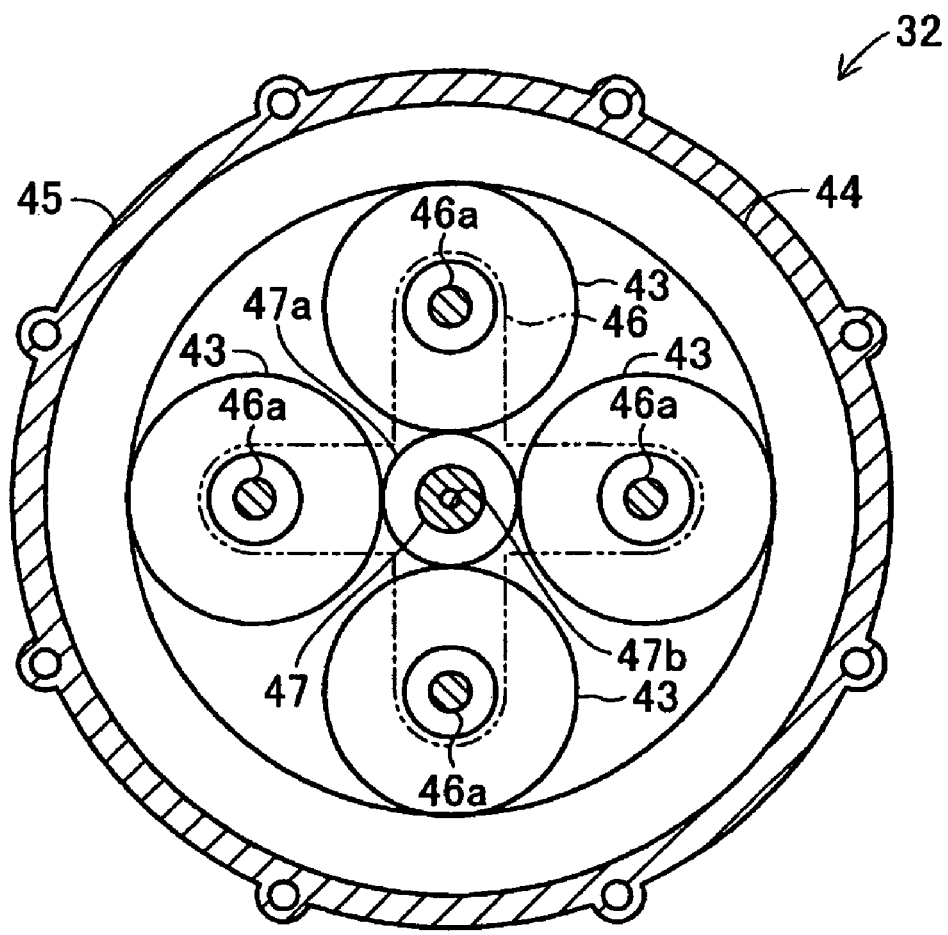
FIG. 5 is a sectional view taken along line 5-5 in FIG. 3.

The speed increasing mechanism 32 can be disposed in front of the drive shaft 37, for example, as shown in FIG. 5. In some embodiments, the speed increasing mechanism 32 can include four planetary rollers 43 and a ring roller 44 in frictional contact with the planetary rollers 43. The four planetary rollers 43 can each have a peripheral frictional contact surface and can be connected to the front end of the drive shaft 37 through a support member 46.

The support member 46 can be formed with a cross shape as seen in the front-to-rear direction, with respective front side distal ends provided with support shafts 46a. Each of the support shafts 46a supports the planetary roller 43 to be rotatable in the same rotating direction as that of the drive shaft 37. The support member 46 can be joined to the drive shaft 37 by press-fitting its front end into the hole bored in the center of the support member 46.

The ring roller 44 can be disposed around the planetary rollers 43 and can comprise an annular member with its inside round surface formed as a frictional contact surface, and secured to the inside round surface of a cylindrical second housing 45 formed as connected to the first housing 35. In other words, the second housing 45 can be formed in a cylindrical shape with one end closed and with its other end opening attached to the front side of the first housing 35, and with its interior accommodating the speed increasing mechanism 32 connected to the drive shaft 37. Therefore, when the drive shaft 37 rotates, the four planetary rollers 43 supported with the support member 46 in frictional contact with the ring roller 44 revolve along the inside round surface of the ring roller 44, while themselves rotating about the support shafts 46a.

A rotary shaft 47, with its outside round surface having a sun roller 47a in contact with the planetary rollers 43, can be disposed in the middle of the planetary rollers 43. The rotary shaft 47 can be disposed coaxially with and in front of the drive shaft 37, and can extend forward through the second housing 45.

A bearing 48a can be provided around the rotary shaft 47 approximately in the middle of its axial length, so that the rotary shaft 47 can be supported rotatably on the second housing 45 through the bearing 48a. The rear end portion of the rotary shaft 47 can be rotatably inserted into the oil hole 37b bored into the drive shaft 37.

Thus, as the four planetary rollers 43 revolve while themselves rotating, the drive shaft 47 can be driven to rotate. In this case, the rotary shaft 47 rotates at increased speeds according to the step-up ratio between the ring roller 44 and the planetary rollers 43 and according to the step-up ratio between the planetary rollers 43 and the sun roller 47a of the rotary shaft 47.

The rotary shaft 47 can be provided with a dead-end oil hole 47b extending axially forward from the center of the rear end surface. A through hole 47c radially passing through the rotary shaft 47, communicating with the oil hole 47b, can be provided in the peripheral surface of the sun roller 47a of the rotary shaft 47.

A communication hole 47d, which can communicate with the oil hole 47b, can be provided in front of the bearing 48a. An oil seal 48b of annular shape can be disposed around the rotary shaft 47 in front of the communication hole 47d with a clearance to the bearing 48a to prevent lubricant oil from leaking out of the second housing 45.

The lower part of the second housing 45 can communicate, through the communication hole 42, with the oil sump 35a. The lower end portion 42a of the communication hole 42 can be located higher than the bottom of the interior of the second housing 45 and lower than the frictional contact surface of the lowermost part of the ring roller 44.

In other words, the lower end portion 42a of the communication hole 42 can be located below the lowermost portion of any of the planetary rollers 43 that happens to be in the lowest position. The bottom surface of the second housing 45 can be set to a position higher than the bottom surface of the oil sump 35a.

The supercharging mechanism 33 can be disposed on the front end side of the rotary shaft 47. The supercharging mechanism 33 can include a third housing 50 having an air intake port 49a for suctioning air sent from the intake box 24 through the air passage 23a, and an air discharge port 49b for sending air suctioned from the air intake port 49a to the intercooler side.

A turbine 51 configured for compressing air suctioned through the air intake port 49a, can be attached to the front end portion of the rotary shaft 47 inside the third housing 50. The turbine 51 can rotate together with the rotation of the rotary shaft 47 to send air suctioned through the air intake port 49a to the air discharge port 49b.

The exhaust system 27 for discharging exhaust gas to the outside of the boat can be made up of an exhaust pipe 28, a water lock 29, as well as other components. The upstream end of the exhaust pipe 28 can be connected to the exhaust ports of the respective cylinders opening on the starboard side of the engine 18. The exhaust pipe 28 can extend through curves along the starboard side, front side, and portside of the engine 18, and its downstream end can be connected to the water lock 29.

The water lock 29 can be made of a large-sized cylindrical tank with an exhaust gas tube 29a extending rearward from the rear upper surface of the tank. The upstream end of the exhaust gas tube 29a can be connected with the top surface of the water lock 29, and its downstream side can extend upwardly and then downwardly and rearwardly. The downstream end of the exhaust gas tube 29a extends through the rear end part of the boat body 13 to the outside.

During operation, when a rider straddling on the seat 15 of the watercraft 10 turns on the start switch (not shown), the watercraft 10 is ready to run. As the rider operates the steering handlebars 14 and other devices, the watercraft 10 runs in the intended directions at intended speeds.

In this case, the supercharger 30, with the operation of the engine 18, compresses air supplied from the intake box 24 and discharges it to the engine 18. At this time, the pump mechanism 31 of the supercharger 30 supplies lubricant oil to the speed increasing mechanism 32 to smooth the operation of the speed increasing mechanism 32.

As the engine 18 operates to rotate the drive shaft 37, the screw 39 rotates together with the drive shaft 37, and air flow occurs in the direction from the upstream side (right hand in FIG. 3) toward the downstream side (left hand in FIG. 3) of the pump chamber 34. As a result, lubricant oil in the oil sump 35a can be drawn through the oil introduction tube 41, the oil introduction hole 34c, etc. to the pump chamber 34, and further sent into the oil hole 37b through the through hole 37c.

Part of the lubricant oil drawn into the oil hole 37b can be supplied through the communication holes 37d and 37e to the bearings 38a and 38b. Lubricant oil supplied through the communication hole 37d to the bearing 38a lubricates the bearing 38a and then returns to the upstream side of the pump chamber 34 through the clearance between the outside round surface of the flange portion 40a and the inside round surface of the small diameter portion 34a.

Lubricant oil can be supplied to the bearing 38b, not only through the oil hole 37e, but also from the pump chamber 34 through the clearance between the outside round surface of the flange portion 40b and the inside round surface of the large diameter portion 34b. The lubricant oil supplied to the bearing 38b, after lubricating the bearing 38b, naturally falls down and collects at the bottom of the second housing 45. When the lubricant oil level exceeds the lower end 42a of the communication hole 42, the exceeding amount of oil naturally flows down into the oil sump 35a.

The remaining part of the lubricant oil introduced into the oil hole 37b finds its way into the area where the rotary shaft 47 fits to the oil hole 37b and also into the oil hole 47b of the rotary shaft 47. The lubricant oil having entered the fitting area between the rotary shaft 47 and the oil hole 37b, after lubricating the fitting area, naturally falls down and collects at the bottom of the second housing 45.

Lubricant oil introduced into the oil hole 47b can be supplied to the sun roller 47a and the bearing 48a respectively through the through hole 47c and the communication hole 47d. The lubricant oil supplied to the sun roller 47a lubricates the frictional contact surfaces of the sun roller 47a and the planetary rollers 43.

Lubricant oil having adhered to the planetary rollers 43 lubricates the frictional contact surfaces of the planetary rollers 43 and the ring roller 44. The lubricant oil having lubricated these frictional contact surfaces of the sun roller 47a and the planetary rollers 43 and of the planetary rollers 43 and the ring roller 44 naturally flows down and collects at the bottom of the second housing 45. Lubricant oil supplied to the bearing 48a, after lubricating the bearing 48a, naturally flows down and collects at the bottom of the second housing 45.

Here, because the lower end 42a of the communication hole 42 can be located below the frictional contact surface at the lowest part of the ring roller 44, lubricant oil cannot collect at a height above the above-mentioned frictional contact surface of the ring roller 44. This prevents the planetary roller 43 rotating within the ring roller 44 from being dipped in lubricant oil, so that power loss due to churning resistance of lubricant oil by the rotation of the planetary rollers 43 can be reduced.

Lubricant oil collected in the oil sump 35a can be used again through the oil introduction tube 41 and others to lubricate the speed increasing mechanism 32 and others. In other words, lubricant oil circulates between the pump mechanism 31 and the speed increasing mechanism 32. In this case, as shown in FIG. 3, the oil level L remains at a height lower than the lowest end 42a of the communication hole 42 while lubricant oil in the oil sump 35a circulates between the pump mechanism 31 and the speed increasing mechanism 32.

On the other hand, coolant water can be introduced from the engine 18 through the water distribution tube 26b into the coolant fluid chamber 35b. The coolant water, while circulating through the coolant fluid chamber 35b, cools lubricant oil in both the oil sump 35a and the pump chamber 34, and can be discharged through the drain tube 26c to the outside of the boat. Thus, lubricant oil can be prevented from heating up.

As is understood from the above description of operation, this embodiment, adapted to send lubricant oil in the longitudinal direction of the pump chamber 34 by the rotation of the screw 39, can supply lubricant oil to the speed increasing mechanism without increasing the outside diameter or speed of the screw pump. As a result, the outside diameter of the screw 39 can be reduced so that it is possible to downsize the pump mechanism 31 and hence the structure of the supercharger 30. This also permits reducing the moment of inertia and churning resistance of lubricant oil when the screw 39 rotates, resulting in reduction of power loss.

Further, reduction in rotation speed of the screw 39 permits making the supercharger 30 more simple and less expensive as a whole. Furthermore, because the peripheral edge portion of the screw 39 is made not to come into contact with the inside round surface of the small diameter portion 34a, the speed of the drive shaft 37 may be increased to permit application to the engine 18 of high-speed types.

In some embodiments, the pump mechanism 31, the speed increasing mechanism 32, and the supercharging mechanism 33 can be placed one after another in the axial direction of the drive shaft 37, and the oil sump 35a can be placed below one of those, the pump mechanism 31. This permits making the oil sump 35a compact. Placing the oil sump 35a below the pump mechanism 31 downsized by the use of the screw pump also permits making the entire supercharger 30 compact.

Moreover, because the flange portions 40a and 40b are provided around the drive shaft 37 at both front and rear end sides of the screw 39 to form the pump chamber 34 for accommodating the screw 39 using the space with the small diameter portion 34a and the large diameter portion 34b between the flange portions 40a and 40b, the pump chamber 34 can be made with a simple, compact structure. This also facilitates assembly of the pump chamber 34, requiring only insertion of the drive shaft 37 into the cylindrical portion of the partition wall 35c.

The planetary rollers 43 rotating within the ring roller 44 are prevented from being dipped in lubricant oil, so that power loss due to churning resistance of lubricant oil by the rotation of the planetary rollers 43 can be reduced.

Further, because the oil introduction passage for supplying lubricant oil to the bearings 38a, 38b, and 48a, and the speed increasing mechanism 32 can be formed within both the drive shaft 37 and the rotary shaft 47, it can be possible to make the supercharger 30 in a compact, simple structure. Here, because the oil hole 47b of the rotary shaft 47 can be communicated with the oil hole 37b of the drive shaft 37 by fitting the rotary shaft 47 rotatably into the oil hole 37b of the drive shaft 37, it can be possible to communicate the oil holes 47b and 37b of the two shafts rotating at different speeds using a simple structure and to supply lubricant oil to both the shafts with a simple structure.

Also in this embodiment, the coolant fluid chamber 35b can be provided to surround the pump chamber 34 and the oil sump 35a. This makes it possible to cool lubricant oil effectively with a simple structure.

Figure 6:
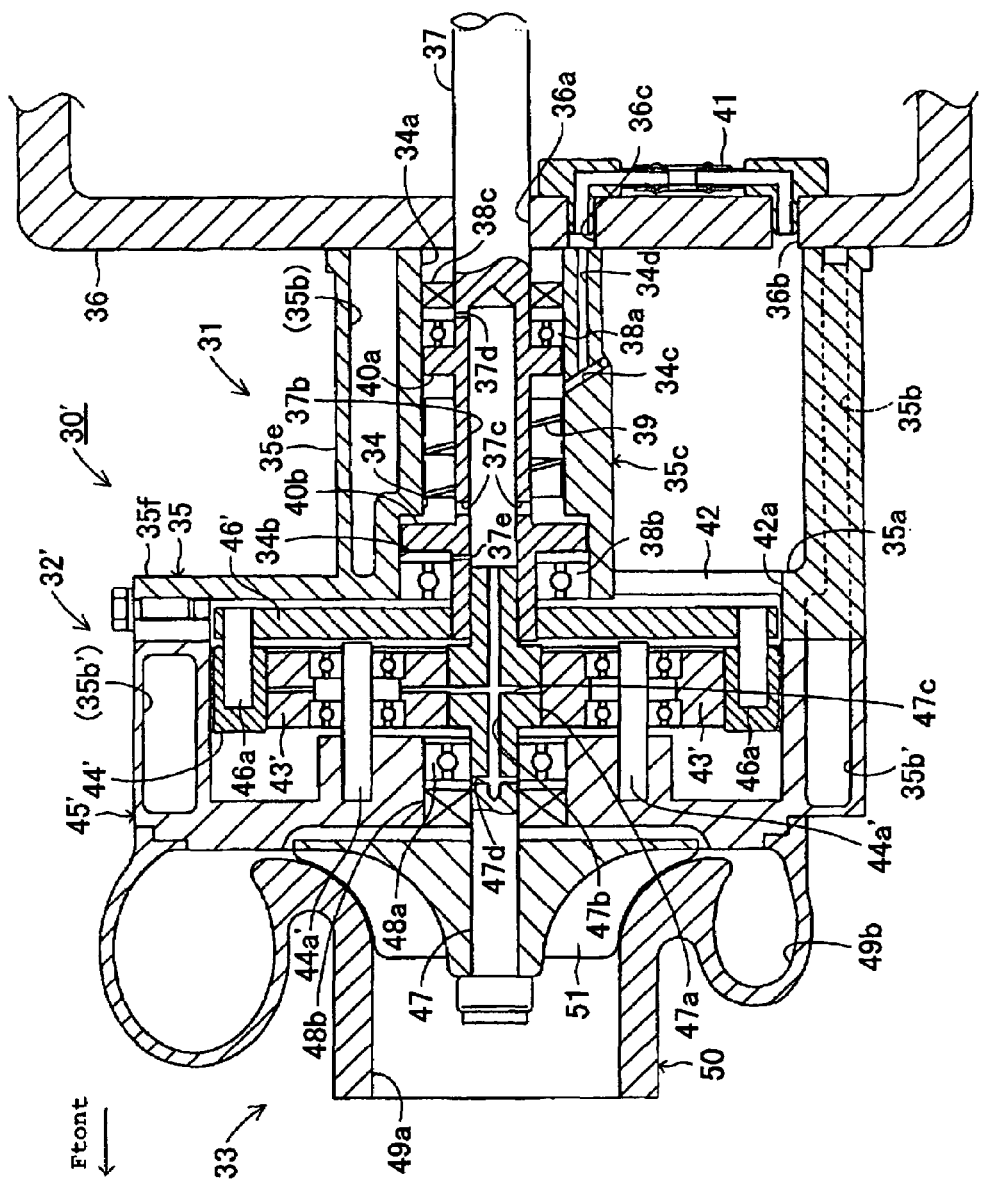
FIG. 6 is a sectional view of a modification of the supercharger lubrication system illustrated in FIGS. 1-5.

FIG. 6 shows a supercharger 30' provided with a modification to the lubrication system illustrated in FIGS. 1-5. In this supercharger 30', in addition to the coolant fluid chamber 35b provided to both the pump mechanism 31 and the oil sump 35a, a coolant fluid chamber 35b' is also provided to the speed increasing mechanism 32'. In other words, the coolant fluid chamber 35b' is provided in the state of surrounding the speed increasing mechanism 32', with the lower portions of the coolant fluid chamber 35b and the coolant fluid chamber 35b' communicated in the front-to-rear direction. Therefore, coolant water introduced into the coolant fluid chamber 35b can be also introduced into the coolant fluid chamber 35b'.

The speed increasing mechanism 32' can be constituted that the ring roller 44' can be connected to the front end portion of the drive shaft 37 through the support member 46', and that the four planetary rollers 43' (only two of them are shown) are supported rotatably with the support rods 44a' attached to the second housing 45'. The support rods 44a' extend from the rear side of the front part of the second housing 45' toward the support member 46' and disposed at even intervals along a circle centered on the rotary shaft 47.

The inside round surface of the ring roller 44' can be in frictional contact with the outside round surfaces of the four planetary rollers 43'. In the middle of the four planetary rollers 43' can be disposed the rotary shaft 47 having the sun roller 47a in frictional contact with the four planetary rollers 43'. Thus, as the drive shaft 37 rotates, the ring roller 44' rotates, and its rotary force can be transmitted to the planetary rollers 43'. Further, rotary force of the planetary rollers 43' can be transmitted to the rotary shaft 47 to rotate it at high speeds.

In this speed increasing mechanism 32', the lower end 42a of the communication hole 42 communicating with the oil sump 35a can be located below the outside round surface of the ring roller 44' in consideration of the ring roller 44' that rotates. Because the arrangement of other parts of the lubrication structure of the supercharger of this embodiment can be the same as that of the first embodiment, the same parts are provided with the same symbols and their explanations are not repeated.

With the supercharger lubrication structure of this embodiment, because the coolant fluid chamber 35b' can be provided in addition to the coolant fluid chamber 35b to surround the speed increasing mechanism 32', also the lubricant oil in the speed increasing mechanism 32' is cooled. As a result, lubricant oil can be cooled more effectively. Other functional effects of the lubrication structure of the supercharger of this second embodiment are the same as those of the first embodiment.

Further, embodiments of the inventions disclosed herein are not limited to those described above but may be modified in various ways within the technical scope of this invention. For example, while the above embodiments use the speed increasing mechanism 32 including the rotary shaft 47 having the planetary rollers 43 and the ring roller 44, and the planetary rollers 43 and the sun roller 47a, respectively in frictional contact with each other, this arrangement is optional.

For example, the speed increasing mechanism 32 can comprise planetary gears and a sun gear with external cog wheels in place of the planetary rollers 43 and the sun roller 47a, and an internal cog wheel in place of the ring roller 44. In this case, rotation of the drive shaft 37 can be increased and transmitted to the rotary shaft 47, with the planetary gears meshing with the sun gear, with the planetary gears also meshing with the ring gear, and with respective meshing parts lubricated with lubricant oil.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A supercharger comprising:
   a drive shaft configured to be driven by the rotation of an engine, the drive shaft extending in a first housing;
   a supercharging mechanism including a turbine;
   a rotary shaft connected to the turbine;
   a speed increasing mechanism accommodated in a second housing located between the engine and the supercharging mechanism, the speed increasing mechanism being configured to increase the rotation speed of the drive shaft and to transmit the increased rotation speed to the rotary shaft;
   an oil sump configured to hold lubricant oil for lubricating the speed increasing mechanism; and
   a pump mechanism driven by the rotation of the drive shaft and configured to supply the lubricant oil held in the oil sump to the speed increasing mechanism;
   wherein the pump mechanism comprises a screw pump including a screw spirally provided concentrically on the drive shaft over the outside round surface of the drive shaft in the first housing, a cylindrical member rotatably supporting the drive shaft with a support device and accommodating the screw, and an oil introduction passage configured to connect the oil sump and the interior of the cylindrical member, and wherein a gap is provided between the peripheral edge portion of the screw and the inside round surface of the cylindrical member.

2. The supercharger of claim 1, wherein the speed increasing mechanism includes a rotary part connected to the drive shaft and a rotated part to which the rotary force of the rotary part is transmitted, with the rotary part and the rotated part increasing the rotation speed of the drive shaft and transmitting it to the rotary shaft, and wherein the lower portion of the housing and the oil sump are connected through a communication flow passage, with the bottom portions of the communication flow passage and the oil sump located lower than the lowermost portion of the rotary part of the speed increasing mechanism so that the lubricant oil supplied to and having lubricated the speed increasing mechanism naturally falls down and returns through the communication flow passage to the oil sump.

3. The supercharger of claim 2 additionally comprising a coolant fluid chamber configured to cool the lubricant oil held in the oil sump, the coolant fluid chamber being defined by a partition wall of the oil sump.

4. The supercharger of claim 2, wherein the pump mechanism, the speed increasing mechanism, and the supercharging mechanism are placed side by side from the engine side along the direction of the drive shaft axis, with the oil sump provided below at least one of the pump mechanism and the speed increasing mechanism.

5. The supercharger of claim 2, wherein the drive shaft and the rotary shaft are disposed coaxially end to end, the drive shaft includes a center hole extending axially from its end face opposing the rotary shaft toward its opposite end, and a communication hole extending from its outside round surface to the center hole, such that the lubricant oil supplied from the oil sump is led through the communication hole into the center hole and further into the speed increasing mechanism.

6. The supercharger of claim 1 additionally comprising a coolant fluid chamber configured to cool the lubricant oil held in the oil sump, the coolant fluid chamber being defined by a partition wall of the oil sump.

7. The supercharger of claim 6, wherein the pump mechanism, the speed increasing mechanism, and the supercharging mechanism are placed side by side from the engine side along the direction of the drive shaft axis, with the oil sump provided below at least one of the pump mechanism and the speed increasing mechanism.

8. The supercharger of claim 7, wherein the drive shaft and the rotary shaft are disposed coaxially end to end, the drive shaft includes a center hole extending axially from its end face opposing the rotary shaft toward its opposite end, and a communication hole extending from its outside round surface to the center hole, such that the lubricant oil supplied from the oil sump is led through the communication hole into the center hole and further into the speed increasing mechanism.

9. The supercharger of claim 8, wherein the opposing end faces of the drive shaft and the rotary shaft are disposed in contact with each other, wherein the turbine of the supercharging mechanism is provided on one end side of the rotary shaft and the speed increasing mechanism is provided on the other end side of the rotary shaft, wherein the rotary shaft is provided with a center hole extending axially from its end face opposing the drive shaft toward the supercharging mechanism, and a communication hole extending from its outside round surface to the center hole, and wherein the center hole in the drive shaft and the center hole in the rotary shaft are communicated with each other so that the lubricant oil supplied through the center hole in the drive shaft is supplied through both the center hole and the communication hole in the rotary shaft to the speed increasing mechanism.

10. The supercharger of claim 9, wherein the opposing ends of the drive shaft and the rotary shaft are fitted together to be freely rotatable relative to each other.

11. The supercharger of claim 6, wherein the drive shaft and the rotary shaft are disposed coaxially end to end, the drive shaft includes a center hole extending axially from its end face opposing the rotary shaft toward its opposite end, and a communication hole extending from its outside round surface to the center hole, such that the lubricant oil supplied from the oil sump is led through the communication hole into the center hole and further into the speed increasing mechanism.

12. The supercharger of claim 1, wherein the pump mechanism, the speed increasing mechanism, and the supercharging mechanism are placed side by side from the engine side along the direction of the drive shaft axis, with the oil sump provided below at least one of the pump mechanism and the speed increasing mechanism.

13. The supercharger of claim 1, wherein the drive shaft and the rotary shaft are disposed coaxially end to end, the drive shaft includes a center hole extending axially from its end face opposing the rotary shaft toward its opposite end, and a communication hole extending from its outside round surface to the center hole, such that the lubricant oil supplied from the oil sump is led through the communication hole into the center hole and further into the speed increasing mechanism.

14. A supercharger comprising:
a drive shaft configured to be driven by the rotation of an engine;
a supercharging mechanism including a turbine;
a rotary shaft connected to the turbine;
a speed increasing mechanism accommodated in a housing located between the engine and the supercharging mechanism, the speed increasing mechanism being configured to increase the rotation speed of the drive shaft and to transmit the increased rotation speed to the rotary shaft;
an oil sump configured to hold lubricant oil for lubricating the speed increasing mechanism;
a pump mechanism driven by the rotation of the drive shaft and configured to supply the lubricant oil held in the oil sump to the speed increasing mechanism; wherein the pump mechanism comprises a screw pump including a screw spirally provided concentrically on the drive shaft over the outside round surface of the drive shaft, a cylindrical member rotatably supporting the drive shaft with a support device and accommodating the screw, and an oil introduction passage configured to connect the oil sump and the interior of the cylindrical member, and wherein a gap is provided between the peripheral edge portion of the screw and the inside round surface of the cylindrical member; and
generally disk-shaped flange portions projecting in a direction perpendicular to the drive shaft axis provided at both end side portions of the screw on the outside round surface of the drive shaft, wherein a clearance is provided between the inside round surface of the cylindrical member and the outside round surface of the flange portions, and a pump chamber formed between the outside round surface of the drive shaft and the inside round surface of the cylindrical member and between the flange portions.

15. The supercharger of claim 14, wherein the speed increasing mechanism includes a rotary part connected to the drive shaft and a rotated part to which the rotary force of the rotary part is transmitted, with the rotary part and the rotated part increasing the rotation speed of the drive shaft and transmitting it to the rotary shaft, and wherein the lower portion of the housing and the oil sump are connected through a communication flow passage, with the bottom portions of the communication flow passage and the oil sump located lower than the lowermost portion of the rotary part of the speed increasing mechanism so that the lubricant oil supplied to and having lubricated the speed increasing mechanism naturally falls down and returns through the communication flow passage to the oil sump.

16. The supercharger of claim 14 additionally comprising a coolant fluid chamber configured to cool the lubricant oil held in the oil sump, the coolant fluid chamber being defined by a partition wall of the oil sump.

17. The supercharger of claim 16, wherein the coolant fluid chamber is configured to surround the oil sump.

18. The supercharger of claim 14, wherein the pump mechanism, the speed increasing mechanism, and the supercharging mechanism are placed side by side from the engine side along the direction of the drive shaft axis, with the oil sump provided below at least one of the pump mechanism and the speed increasing mechanism.

19. The supercharger of claim 14, wherein the drive shaft and the rotary shaft are disposed coaxially end to end, the drive shaft includes a center hole extending axially from its end face opposing the rotary shaft toward its opposite end, and a communication hole extending from its outside round surface to the center hole, such that the lubricant oil supplied from the oil sump is led through the communication hole into the center hole and further into the speed increasing mechanism.

* * * * *